(12) United States Patent
Bianchi

(10) Patent No.: US 6,237,901 B1
(45) Date of Patent: May 29, 2001

(54) VEHICLE WHEEL SUSPENSIONS USING SPRING COMBINED WITH FLEXIBLE ARMORING FOR MODIFYING THE STIFFNESS CURVE

(75) Inventor: Mauro Bianchi, La Garde Freinet (FR)

(73) Assignee: Mauro Bianchi S.A., Puteaux (FR)

( * ) Notice: Subject to any disclaimer, the term of this patent is extended or adjusted under 35 U.S.C. 154(b) by 0 days.

(21) Appl. No.: 09/319,728

(22) PCT Filed: Dec. 10, 1997

(86) PCT No.: PCT/FR97/02264

§ 371 Date: Jun. 11, 1999

§ 102(e) Date: Jun. 11, 1999

(87) PCT Pub. No.: WO98/26193

PCT Pub. Date: Jun. 18, 1998

(30) Foreign Application Priority Data

Dec. 12, 1996 (FR) .................................................. 96 15476

(51) Int. Cl.⁷ ................ F16F 01/12; F16F 3/12; B60G 11/52; B60G 17/02; B60G 15/06
(52) U.S. Cl. ............................ 267/33; 267/286; 267/292; 267/166
(58) Field of Search ............................ 267/33, 286–291, 267/292–294, 153, 152, 141, 166, 169, 170, 175, 177, 180, 218, 219, 221, 224, 225; 280/6.158, 124.158, 124.162, 124.77, 124.79

(56) References Cited

U.S. PATENT DOCUMENTS

| | | |
|---|---|---|
| 1,783,801 | 12/1930 | Leipert . |
| 2,437,631 | 3/1948 | Wood . |
| 3,014,713 | 12/1961 | Fenton . |
| 3,417,986 | 12/1968 | Fuke . |
| 3,674,250 | 7/1972 | Joseph . |
| 4,817,921 | * 4/1989 | Stevenson ............................. 267/33 |
| 4,886,256 | * 12/1989 | Nishiyama et al. ................. 267/221 |
| 4,957,277 | * 9/1990 | Paton ................................... 267/33 |
| 5,096,168 | * 3/1992 | Takehara et al. .................... 267/220 |
| 5,183,285 | * 2/1993 | Bianchi . |
| 5,244,190 | * 9/1993 | Bianchi ................................ 267/286 |

FOREIGN PATENT DOCUMENTS

| | | |
|---|---|---|
| 35 17 900 | 11/1985 | (DE) . |
| 0 518 759 | 12/1992 | (EP) . |
| 0 520 928 | 12/1992 | (EP) . |
| 598.034 | 12/1925 | (FR) . |
| 2.038.672 | 1/1971 | (FR) . |
| 497051 | 12/1938 | (GB) . |
| 895798 | 5/1962 | (GB) . |
| 2 153 483 | 8/1985 | (GB) . |
| 62-155345 | 7/1987 | (JP) . |
| 63-219933 | 9/1988 | (JP) . |

* cited by examiner

Primary Examiner—Douglas C. Butler
(74) Attorney, Agent, or Firm—Young & Thompson

(57) ABSTRACT

A suspension for a vehicle wheel includes at least one helicoidal spring and at least one flexible retaining and connecting armoring, which in working position, stresses a portion of the spring by maintaining it compressed to obtain two different stiffness curves.

13 Claims, 15 Drawing Sheets

VEHICLE WHEEL SUSPENSIONS USING SPRING COMBINED WITH FLEXIBLE ARMORING FOR MODIFYING THE STIFFNESS CURVE

BACKGROUND OF THE INVENTION

The present invention relates to a new type of suspension with dynamically variable flexibility or stiffness and whose flexibility is increased in the region of rising of the wheels to the shock abutment position, and whose stiffness is increased in the normal working region to the suspended wheel position.

DESCRIPTION OF THE RELATED ART

Until the present, most suspensions have linear flexibility and use stiffnesses which are the result of a compromise between vertical comfort and supporting the chassis of the vehicle. Thus, the vertical comfort and shock absorbing require high flexibility which permit less transmission of the forces generated in the chassis, as well as low frequencies of oscillation favorable to the comfort of the occupants, whilst supporting the chassis of the vehicles requires, by contrast, high stiffness adapted to counter with low amplitude the movement of the mass.

So as to optimize this compromise, there has been provided anti-deflection bars, which, upon lateral shifting of the mass, stiffen the suspensions when turning, so as to decrease the amplitudes of clearance. The drawback of these elements is that they connect the wheels of a same train, rendering them less independent, and that this connection associated with supplemental friction decreases the performance of the vehicle, both as to vertical comfort and as to ease of steering.

Moreover, consecutive mass transfers during longitudinal accelerations are controlled only by the vertical stiffness of the suspensions.

The suspensions with variable flexibility tend to overcome these drawbacks by providing progressively greater stiffnesses in the course of compression. The drawback of these systems resides in the fact that the bearing wheel, which takes the greatest part of the lateral thrust, is hindered by a great stiffness which is harmful to absorption. On the other hand, the interior wheel is excessively relieved because it suffers from a low stiffness.

Another result of this configuration is that the path of compression being decreased, and the path of expansion increased, the center of gravity of the vehicle rises, which is prejudicial to the behavior of the vehicle.

There also exist controlled suspensions.

The principal drawback of suspension center controlled as to shock absorption, as to the roadbed, and/or as to stiffness, resides of course in the complexity of these systems which raises the cost and renders their reliability and their maintenance more critical.

Finally, there exist other suspensions called "CONTRACTIVE" (trademark) which are the object of numerous patents by the applicant.

Such a suspension is disclosed in EP-B-0 446 338 of the applicant, which has for its object a vehicle wheel suspension using several resilient elements mounted in opposition or not, one relative to the other, or a single resilient element with at least one abutment limiting the operation over at least one portion of said element, said suspension using two separate stiffnesses over the full range of clearance of the vehicle wheel on opposite sides of the working position of the suspension, the inflection point between these two stiffnesses being located adjacent the working position of the suspension, said utilization of different stiffnesses taking place dynamically, characterized in that in the case of a single resilient element, there is used an abutment/pan at a particular position of said spring, so as to obtain a stiffness curve with a double slope, the abutment or abutments are placed in contact for a seat corresponding to the vehicle in working condition, this being done such that, from this position, the abutments are separated and all of the coil spring is stressed upon total collapse of the suspension, whilst in the course of expansion, the presence of an abutment limits the operation over a reduced portion of said helical spring.

This type of suspension functions on three different principles.

First, there are two separate stiffnesses about the static position of the vehicle.

Secondly, the point of change between these two stiffnesses is located precisely at the static position of the vehicle and is called the self-stabilizing reference point.

Thirdly, this reference point, which causes the suspension to swing from one stiffness to the other, is physically constituted by an abutment, provided with an asymptotic stiffness curve, which permits using the contractive element.

It is imperative that this abutment comprise a resilient element which permits facilitating the passage from one stiffness to the other. On a stiffness curve, this translates by a connecting arc between the two straight lines of flexibility of compression and of expansion.

The CONTRACTIVE suspension is thus an asymmetric suspension whose stiffness and expansion is greater to the stiffness and compression, the change of stiffness taking place about the static position of the vehicle by means of a connection abutment.

Nevertheless, this technique requires, to be adapted to a conventional vehicle, the replacement of the suspension assembly.

SUMMARY OF THE INVENTION

The present invention deals with suspensions comprising one or several helical springs; said springs are used for all of their flexibility in the course of a shock whilst only a portion of these springs decompresses during the expansion phase.

These two phases of shock and expansion have as their origin the "working" position of the vehicle suspension.

According to the invention, the CONTRACTIVE operation is ensured integrally by the spring which has been implanted in lieu and in place of the conventional spring without requiring modification of the basic suspension mechanism.

The cost of conversion is greatly decreased and one can say that the omission of anti-deflection bars and the saving that thus arises will largely compensate the increase in cost of the provision of such springs.

To this end, the present invention relates to a vehicle wheel suspension using at least one helicoidal spring, and at least one flexible retaining and connecting armoring, which in working position, stress a portion of the spring and hold it compressed, to obtain two different stiffness curve whose inflection point is in the region of the working position; relative to this position, upon compression, the assembly of the helicoidal spring is compressed whilst, during expansion, only the unstressed portion of said spring is decompressed, the suspension being therefore asymmetric with the stiffness in expansion which is greater than the stiffness in compression, characterized by the fact that each armoring is constituted, on the one hand, of two securement and retaining elements, one co-acting with all or a portion of a winding of the helicoidal spring, the other co-acting either with all or a portion of another winding of said spring, or with the body of the shock absorber, and on the other hand, of a longitudinal element, deformable in compression and indeformable in expansion, secured to the two securement and retaining elements, the armoring enclosing and constraining at least two windings of said helicoidal spring.

In the case in which the suspension uses a single helicoidal spring and at least one flexible retaining and connecting armoring, in which the two securement elements of each armoring co-act with all or a portion of two windings of the helicoidal spring, each armature is constituted by an elastic band which circumscribes all or a portion of at least two windings of said spring, the securement elements being constituted by loops of the elastic band and the two free ends being secured one to the other.

In the case in which the suspension utilizes a single helicoidal spring and at least one flexible retaining and connecting armature in which the two securement and retaining elements of each armature co-act respectively with all or a portion of one of the spires of the helicoidal spring and with the body of the shock absorber, each armature is constituted by an elastic band which circumscribes all or a portion of at least two windings of said spring, the securement and retaining elements constituted by one loop of the elastic band at the level of the winding and by the two free ends of said band secured to the body of the shock absorber.

In the case in which the flexible retaining end connecting armoring comprises two half-bands of elastic located one within and the other outside the tubular or truncated conical shape constituted by the windings of the helicoidal spring, the external and internal half-bands are secured to each other between all or a portion of two circumscribed and adjacent windings.

According to a first embodiment of the preceding case, the securement of the half-bands takes lace in the plane of the tubular or truncated conical shape constituted by the windings of the helicoidal spring.

According to a second embodiment of the preceding case, the securement of the half-bands takes place outside the plane of the tubular or truncated conical shape constituted by the windings of the helicoidal spring.

In the case in which the suspension uses two helicoidal springs mounted in series and at least one flexible retaining and connecting armoring, in which the two securement elements of each armoring co-act respectively with all or a portion of one of the turns of the helicoidal springs and with the body of the shock absorber, each armoring is constituted by an elastic band which comprises at its two free ends, on the one hand, one of the securement and retaining elements fixed between the two helicoidal springs and, on the other hand, the other securement elements secured to the body of the shock absorber.

According to a first embodiment of the preceding case, the securement element, fixed between the two helicoidal springs, is secured to a bearing pan which serves as an interface between the two springs.

According to a second embodiment of the preceding case, in which the suspension is constituted by at least two retaining and connecting armorings, the securement or retaining elements, fixed between the two helicoidal springs, are secured together by means of a floating pan which separates the two springs.

No matter what the case or manner of embodiment, the retaining and connecting armorings are elastic and enclose the cables which render the armorings deformable in compression and indeformable in expansion.

No matter what the case or the manner of embodiment, each retaining and connecting armoring is provided with a jack permitting adjusting the stress.

According to another embodiment, the present invention relates also to a vehicle wheel suspension using at least one elastic spring, and at least one retaining and connecting armoring, which in the working position, stress a portion of the spring by maintaining it compressed to obtain two different stiffness curves whose inflection point is adjacent the working position; relative to this position, upon a compression, the assembly of the elastic spring is compressed whilst, during an expansion, only the unstressed portion of said spring is decompressed, the suspension being hence asymmetric with a stiffness upon expansion which is greater than the stiffness in compression, characterized by the fact that each retaining and connecting armoring is constituted, on the one hand, of two securement elements, one co-acting with a portion of the elastic spring, the other co-acting with another portion of said spring, and on the other hand, at least one longitudinal element deformable in compression and indeformable in expansion, secured to the two securement elements, the retaining and connecting armoring circumscribing and stressing at least over all or a portion of the length of the elastic spring.

In this case, the securement elements are constituted by an upper bearing pan and a lower bearing pan, connected to each other by longitudinal elements or cables.

BRIEF DESCRIPTION OF THE DRAWINGS

The accompanying drawings are given by way of indicative examples and are not limiting. They represent several preferred embodiments according to the invention. They will permit easy comprehension of the invention.

DESCRIPTION OF THE PREFERRED EMBODIMENTS

The present invention therefore relates to a multitude of suspensions 1, 11, 21, 31, 41, 51, 61, 71 and 81, which have it in common to use at least one helicoidal spring 2, 4, 22, 32, 42, 52, 62a and b, 72a and b or 82a and b, and at least one flexible retaining and connecting armoring 3, 13, 23, 33, 43, 53, 63, 73 or 83 which, in working position, stresses all or a portion of the spring 2, 12, 22, 32, 42, 52, 62a and b, 72a and b or 82a and b, by maintaining it compressed to obtain two different stiffness curves, in which the point of inflection is adjacent the working position.

Relative to this position, upon compression, all of the helicoidal spring is thus stressed whilst upon expansion, only the non-stressed portion of said spring is decompressed.

The suspension is thus symmetric with an expansion stiffness which is greater than the compression stiffness.

According to a preferred embodiment, the expansion stiffness is three times greater than the compression stiffness.

No matter what the embodiment, the retaining and connecting armoring 3, 13, 23, 33, 43, 53, 63, 73 and 83 is constituted on the one hand by two securement elements one co-acting with all or a portion of a helicoidal, the other co-acting either with all or a portion of another winding of said spring, or with the body of the shock absorber and, on the other hand, by a longitudinal element deformable in compression and indeformable in expansion, secured to the two securement elements, the armature circumscribing and stressing at least two windings of the helicoidal spring.

Figure 1:
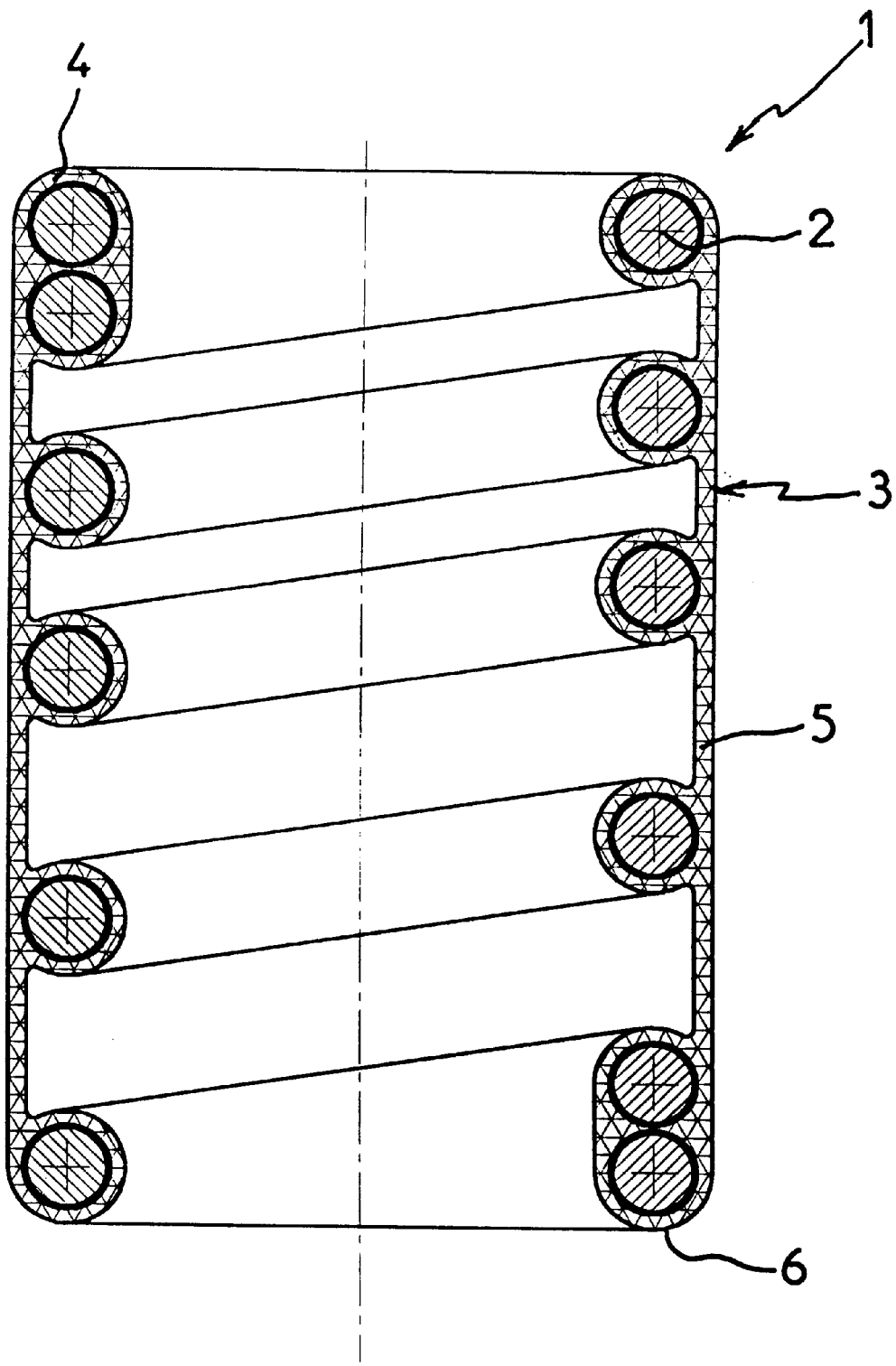
FIG. 1 shows a longitudinal cross-sectional view of a spring according to the invention which comprises a flexible retaining and connecting armoring circumscribing the spring assembly, in a ret position, before the spring being placed in the vehicle.
Figure 2:
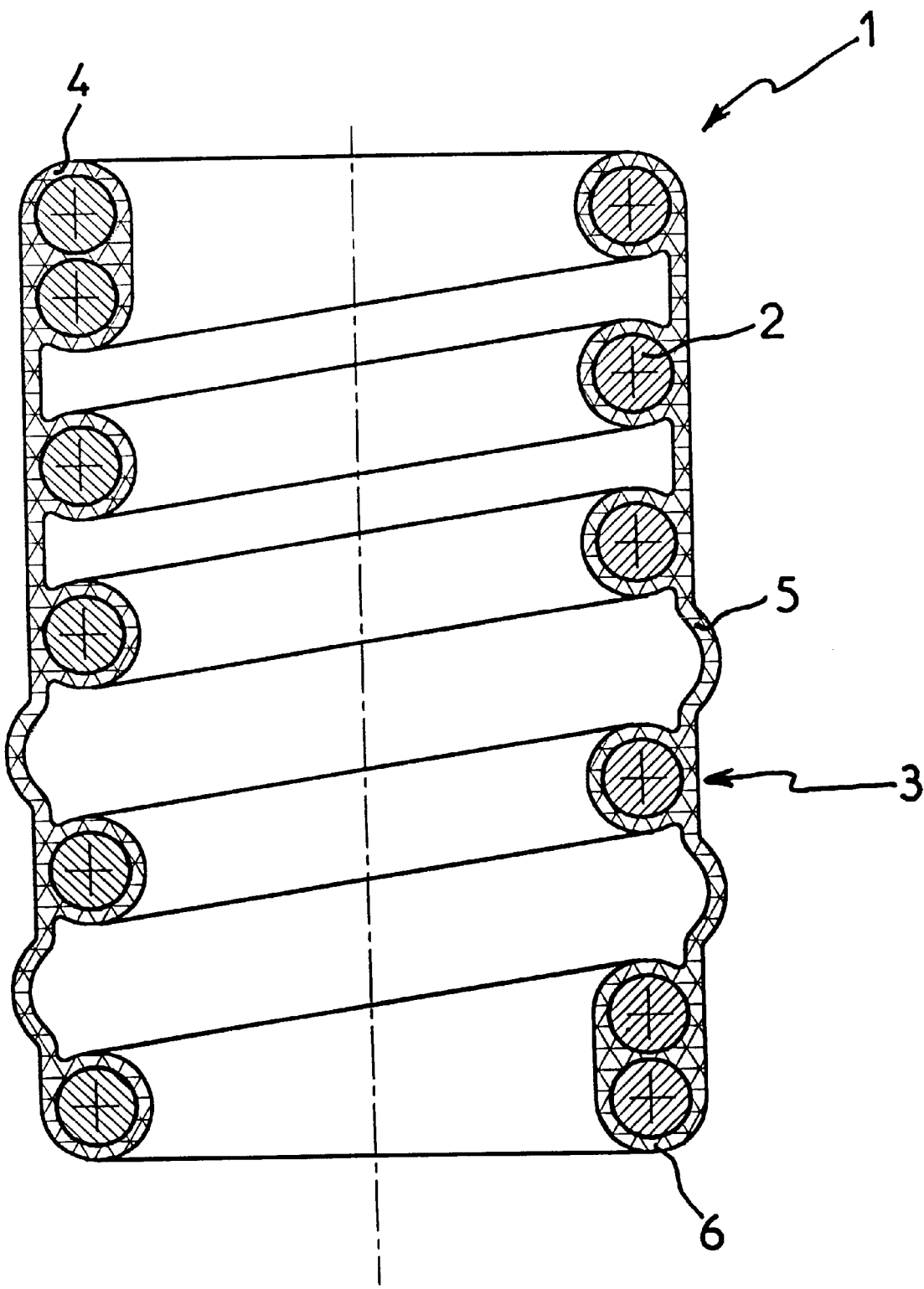
FIG. 2 is a view identical to that of FIG. 1 in which the spring has been mounted on a vehicle and is in static position, subjected to a compression corresponding to the operating load of the vehicle.
Figure 3:
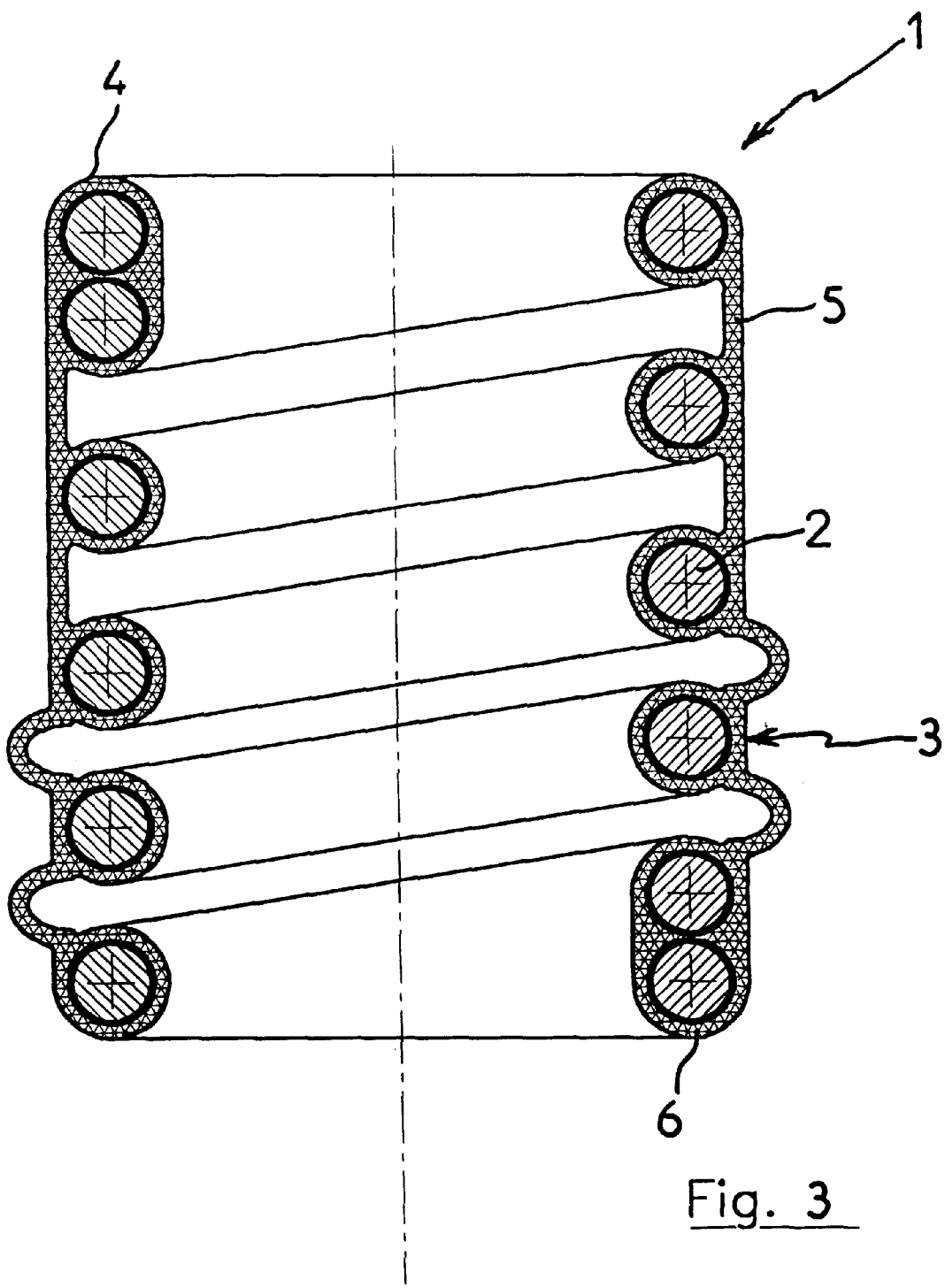
FIG. 3 is a view identical to FIGS. 1 and 2 in which the compression is greater.

According to FIG. 1 to 3, the suspension 1 is constituted by a single helicoidal spring 2 which is straight.

Spring 2 is embedded by molding in a peripheral skirt, thereby creating a sealed volume within the spring.

Thus, this skirt constitutes the retaining and connecting armoring 3 with, at its upper end, the securement element 4 and at its lower end the securement element 6.

Between these two, a longitudinal element 5 or elastic strip serves as a physical connection between the two securement elements 4 and 6.

In this embodiment, said armoring circumscribes all of the windings of the spring.

According to FIG. 1, in its rest position, the sides of the armoring 3 are straight. As will be noted in this figure, the distance separating the various windings is not constant.

It will hence by understood that the windings located in the upper position are already pre-stressed which is not the case for the lower windings.

Because of this, when as is shown in FIGS. 2 and 3, the spring 2 will be mounted on a vehicle, not shown in the drawings, the regions or windings that are the most distant will be brought together, such that there will be a deformation of the sides of the flexible retaining and connecting armature 3 at this level. In this situation, it is a matter of a static position, in which the compression of the upper windings of the suspension 1 is equivalent to the working static pressure of the vehicle.

The distance between all the windings is hence constant in FIG. 3.

It is therefore logical that, upon operation, the windings will react differently according to whether there is an expansion, in which case only the lower windings would play a part, or a compression, in which all the windings will be able to be used.

Figure 4:
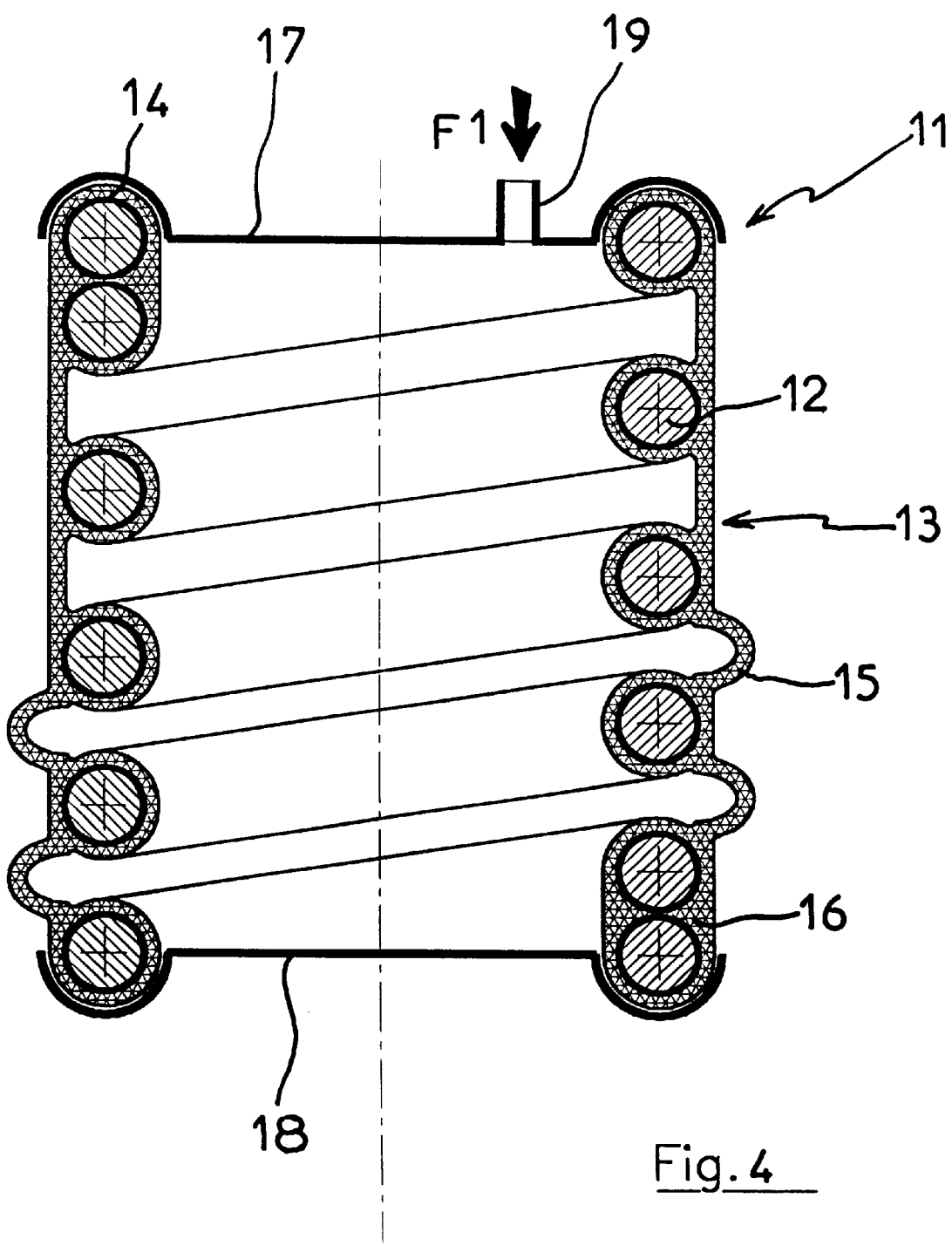
FIG. 4 shows a view identical to FIG. 3, of a second embodiment of the present invention.

According to FIG. 4, the embodiment shown precedingly can be provided with an upper bearing pan 17 and a lower bearing pan 18.

Otherwise, the assembly of the components is identical, there is, at the level of the suspension 11, a spring 12, a retaining and connecting armoring 13, an upper securement element 14, a lower securement element 16 and, between these two elements 14 and 16, a longitudinal element 15 or elastic band.

This elastic band 15 is over-molded on all the turns of the spring.

It will also be noted that at the level of the upper bearing pan 17, there is present a fitting 19 through which can be injected air under pressure in the direction of arrow F1, which permits inflating the interior of the suspension 11 which will behave as a pneumatic jack, thereby giving support in addition to the spring, so as to meet variations in the load of the vehicle.

Of course, it is also possible to place the flexible retaining and connecting armature 3 or 13 only at the level of certain windings of the spring and not at the level of all of these windings.

Figure 5:
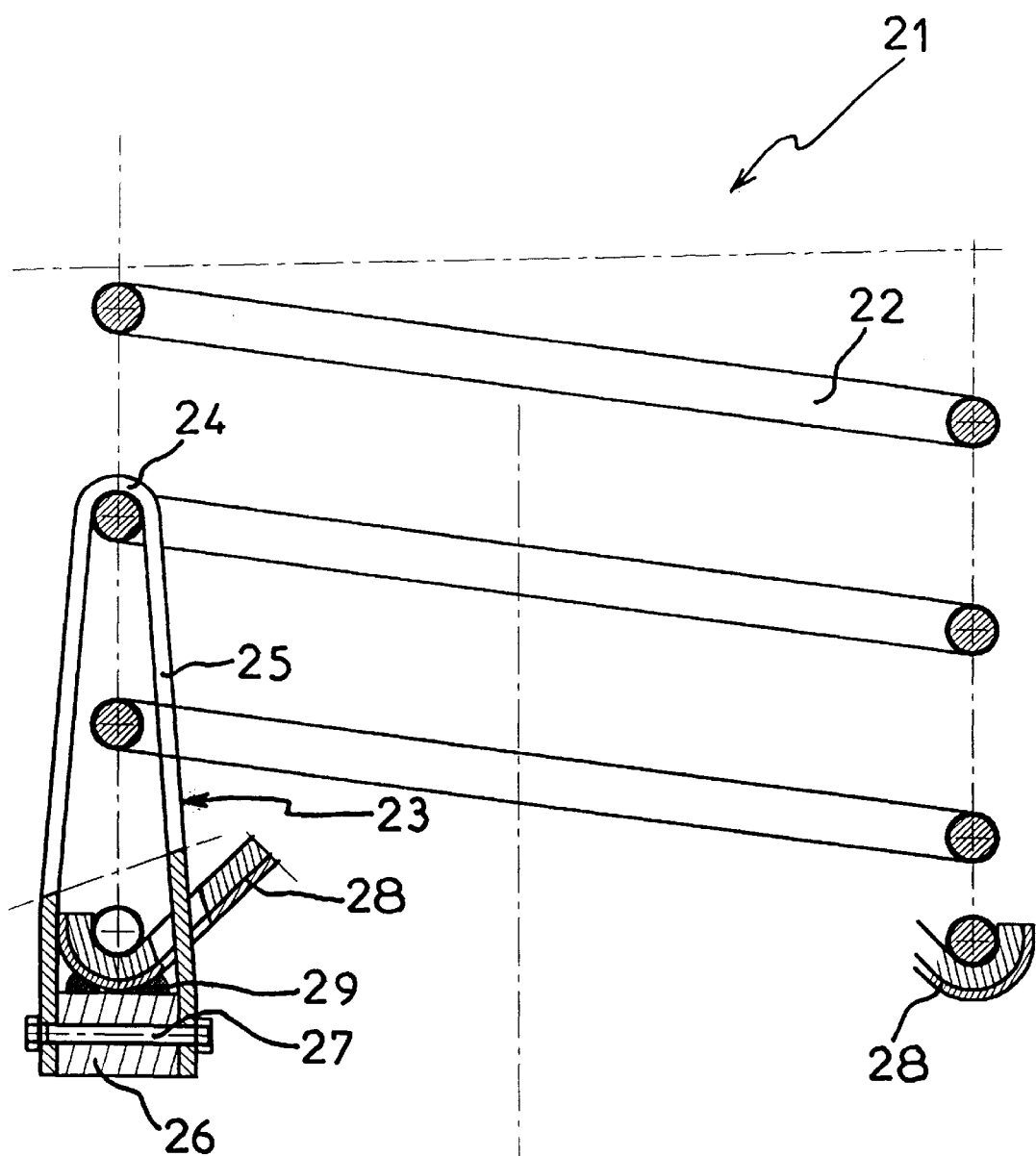
FIG. 5 shows a longitudinal cross-sectional view of a spring according to a third embodiment.

According to the embodiment of FIG. 5, the system is different from those preceding previously described.

This suspension 21 also comprises a helicoidal spring 22 and a flexible retaining and connecting armoring 23, which is essentially constituted by a longitudinal element which comprises two free ends.

In fact, this armoring 23 is bent substantially at the level of its middle to permit creating a loop which will constitute the upper retaining element 24.

The two free ends will constitute, by means of a block, the lower securement element 26, which will co-act with a screw 27 as well as with a lower bearing pan 28 of the spring 22.

The pan 28 having a substantially rounded shape, the upper surface of the lower securement element 26 will comprise weldings 29.

The securement elements 24 and 26 are connected by the split elastic band 25.

Of course, it is possible to envisage that the system takes place over all the circumference of a winding of the spring 22 but according to the embodiment shown in the figures, this armoring 23 is present only at certain positions. It could have two, three, or four or more.

Figure 6:
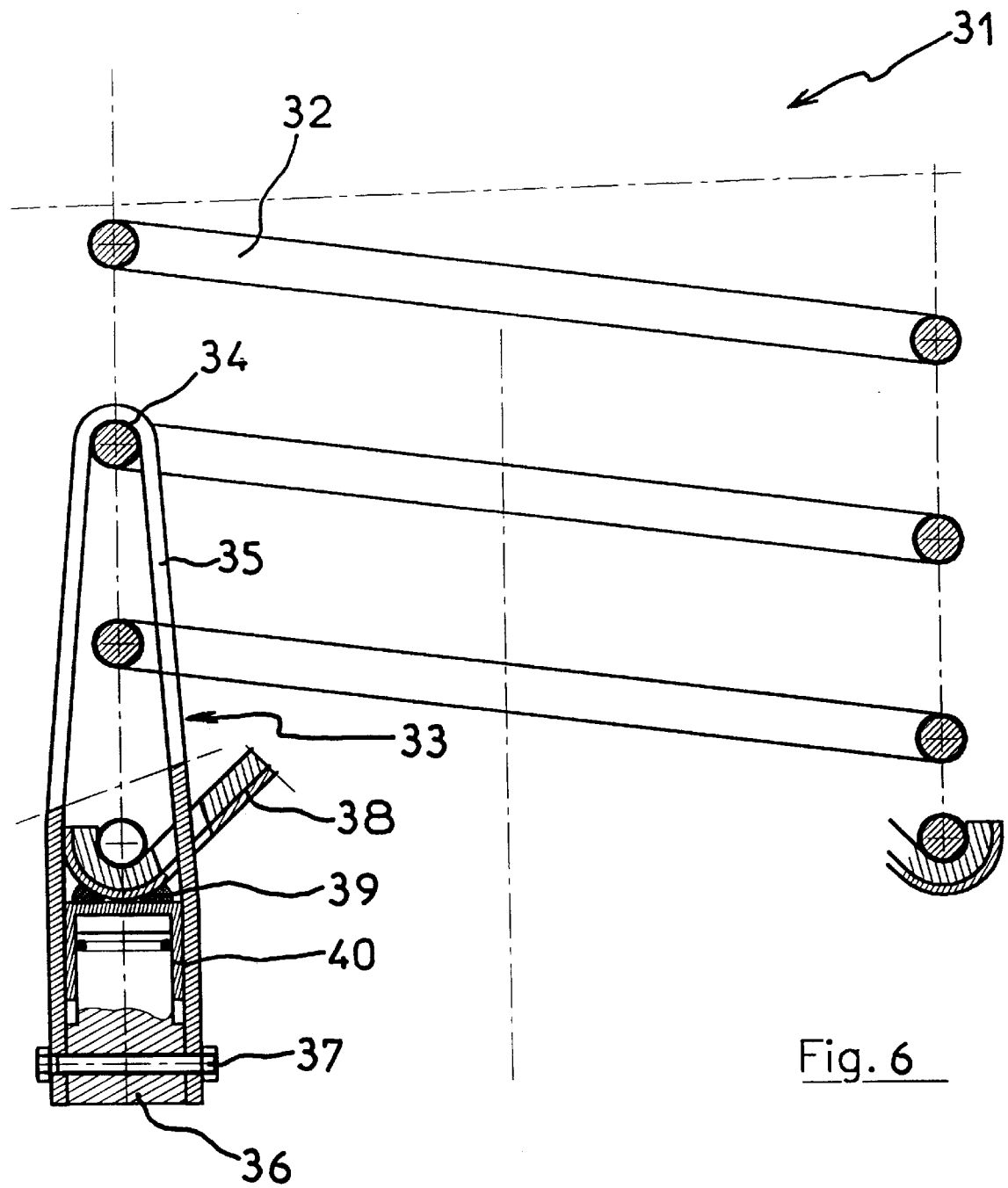
FIG. 6 shows a longitudinal cross-section of a spring according to a fourth embodiment of the present invention.

FIG. 6 shows the essence of the preceding embodiment. There is a suspension 31 which comprises a helicoidal spring 32 of which a part of the windings is circumscribed and maintained in compression by means of the flexible retaining and connecting armoring 33.

The latter comprises an upper retaining element 34 which is constituted by the loop of the elastic band 35, the two ends located in lower position of the elastic band 35 being secured to the lower securement element 36, constituted by a block, by means of screw 37.

Here again, the lower bearing pan 38 of the spring 32 has a slightly curved shape so as to use welds 39.

Nevertheless, the improvement of this invention resides in the presence, between the lower securement element 36 and the lower bearing pan 38, of a jack 40 which permits adapting the pre-stress to the load of the vehicle.

Thus, this jack 40 has the same mission as the air injected under pressure in the direction of the arrow F1 at the fitting 19 of FIG. 4.

This adapts to the static load of the vehicle.

Figure 7:
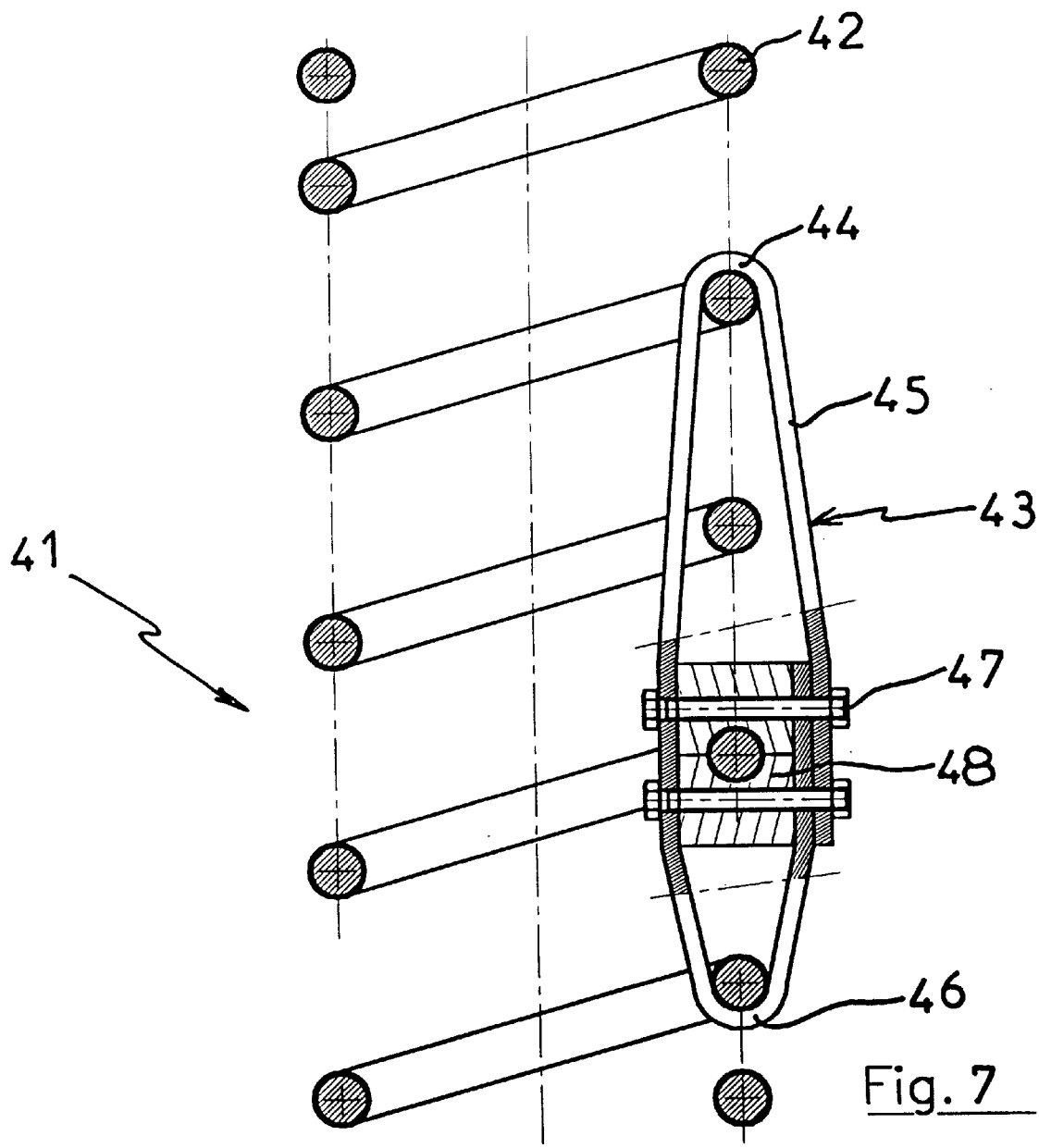
FIG. 7 shows a longitudinal cross-sectional view of a spring according to a fifth embodiment of the present invention.

FIG. 7 relates to another suspension 41 well adapted for a helicoidal spring 42 such as is shown, in which certain windings are stressed by means of a flexible retaining and connecting armoring 43. The latter is essentially constituted by an elastic band 45 which comprises two loops, a lower one, and an upper one which constitute respectively the lower 46 and upper 44 retaining elements.

The two free ends of the elastic band 45 are laterally juxtaposed. They are fixed one to the other by means of two screws 47, each screw 47 being present on opposite sides of a winding of the spring 42.

The flexible retaining and connecting armoring 43 is not however in contact with this winding, because there are two bearing blocks 48 which permit maintaining the internal and external portion of this armoring 43 spaced, which circumscribes several windings of the spring 42.

Of course, as previously, it can if desired be provided that the system be present over all the circumference of the circumscribed windings or again present over several specimen windings entirely about this circumference.

Figure 8:
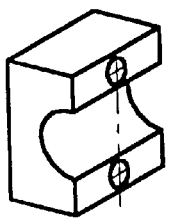
FIGS. 8 and 9 show two other different embodiments of the journal bearings permitting production of the embodiment of FIG. 7.
Figure 9:
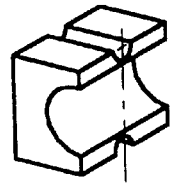

Other examples of bearing blocks are shown in FIGS. 8 and 9. It comprises, for example in FIG. 9, a large half-moon recess which permits good positioning of the winding. The two half-moon half-recesses, upper and lower, permit the passage of the screws 47 to opposite sides of the winding.

Figure 10:
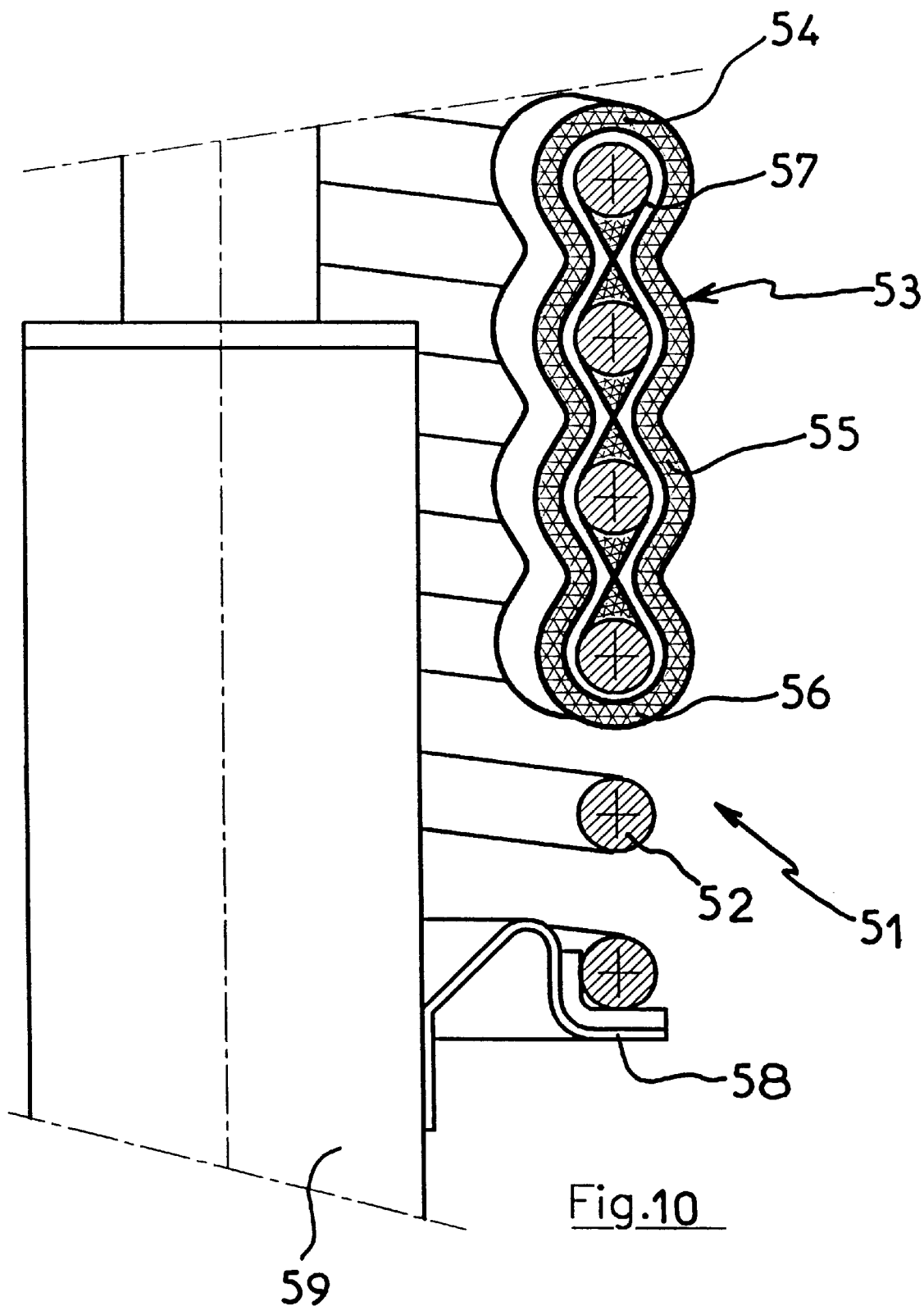
FIG. 10 shows a fragmentary longitudinal cross-sectional view of a suspension according to a sixth embodiment of the present invention.

FIG. 10 shows a suspension 51 which is partially illustrated. The lower portion of the spring 52 bears against the lower bearing pan 58, itself secured to a shock absorber 59.

In this suspension 51, a certain number of windings of the helicoidal spring 52 are circumscribed by means of the flexible retaining and connecting armoring 53.

This technique uses industrial technology derived from that of pneumatics.

The armoring 53 is constituted by straps which are over-molded on certain of the windings of the helicoidal spring 52, which is thus maintained compressed at a value equivalent to the working load of the vehicle to which it is adapted.

These straps are designed so as not to impede the compression of the spring 52 whilst they oppose the decompression of a portion of the usable windings in the course of expansion.

The internal armoring 57 is designed to soften the tensioning and thereby to ensure the good agreement between the expansion stiffness and the compression stiffness.

This armoring 53 is thus constituted in its upper portion by an elastic loop which constitutes the upper securement element 54 and in its lower portion by an elastic loop constituting the lower securement element 56, the two loops being connected to each other by the longitudinal element or elastic band 55, present inside and outside the windings.

According to FIGS. 11 to 14, different embodiments are shown because, each time, the suspension 61, 71, 81 comprises two springs 62a, 62b, 72a, 72b, 82a, 82b.

Figure 11:
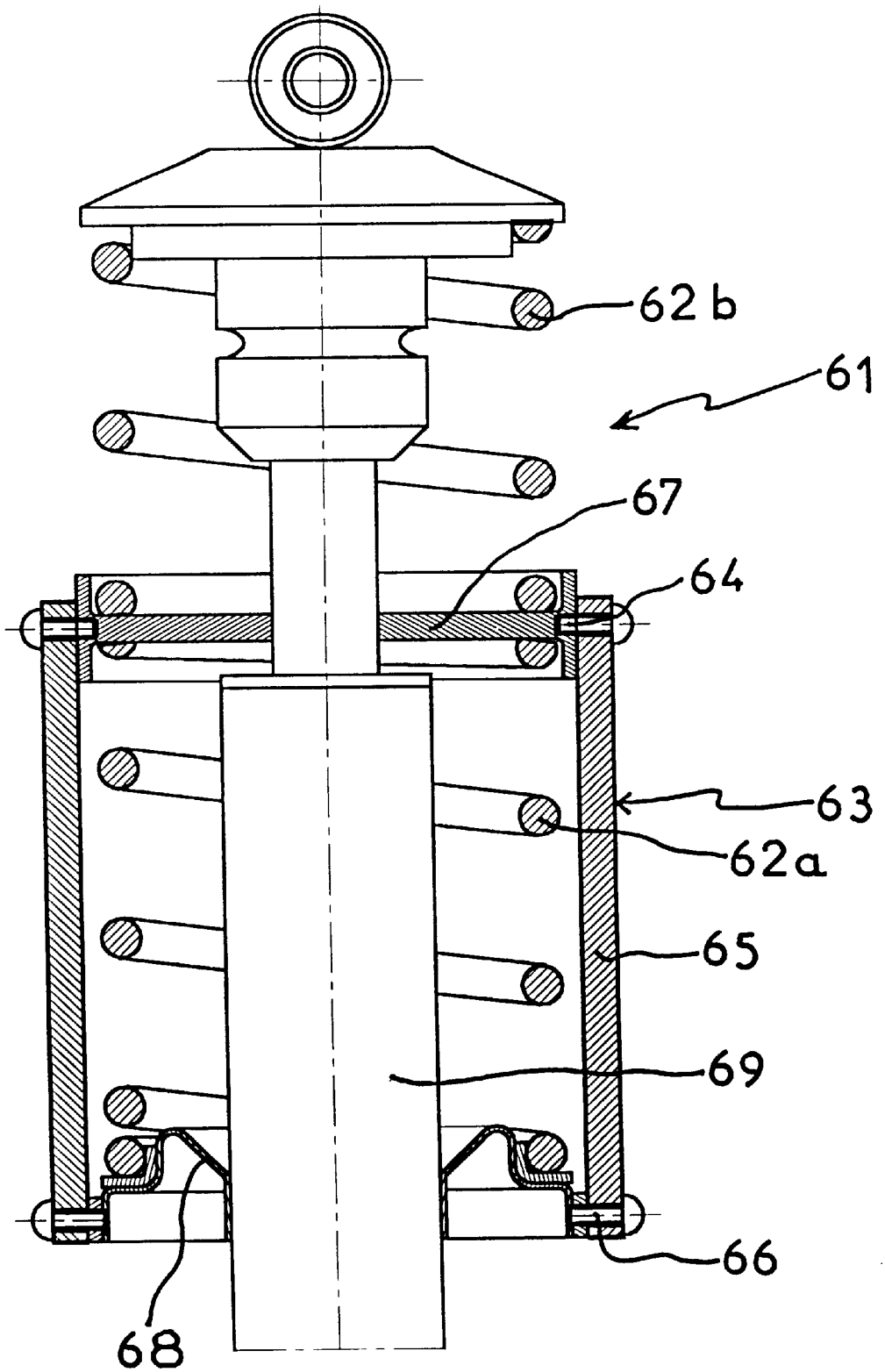
FIG. 11 shows a longitudinal cross-sectional view of a suspension comprising a device according to a seventh embodiment of the present invention.

According to FIG. 11, the suspension 61 comprises an upper spring 62b and a lower spring 62a.

The lower spring 62a is entirely circumscribed between a lower bearing pan 68 and an intermediate bearing pan 67.

Between these two pans 67 and 68, there is a flexible retaining and connecting armoring 63. The latter is constituted by the longitudinal element or elastic band 65 which is secured in the upper position by means of a rivet 64 and in the lower position by means of rivet 66.

In this figure, two armorings 63 are shown, these are opposite each other.

There can be a different number, three if they are disposed at 120° from each other in transverse cross-section, or four, which is to say positioned at 90° in transverse cross-section.

It will be noted in this figure that there is a shock absorber 69.

The lower bearing pan 68 is secured to this shock absorber 69.

Figure 12:
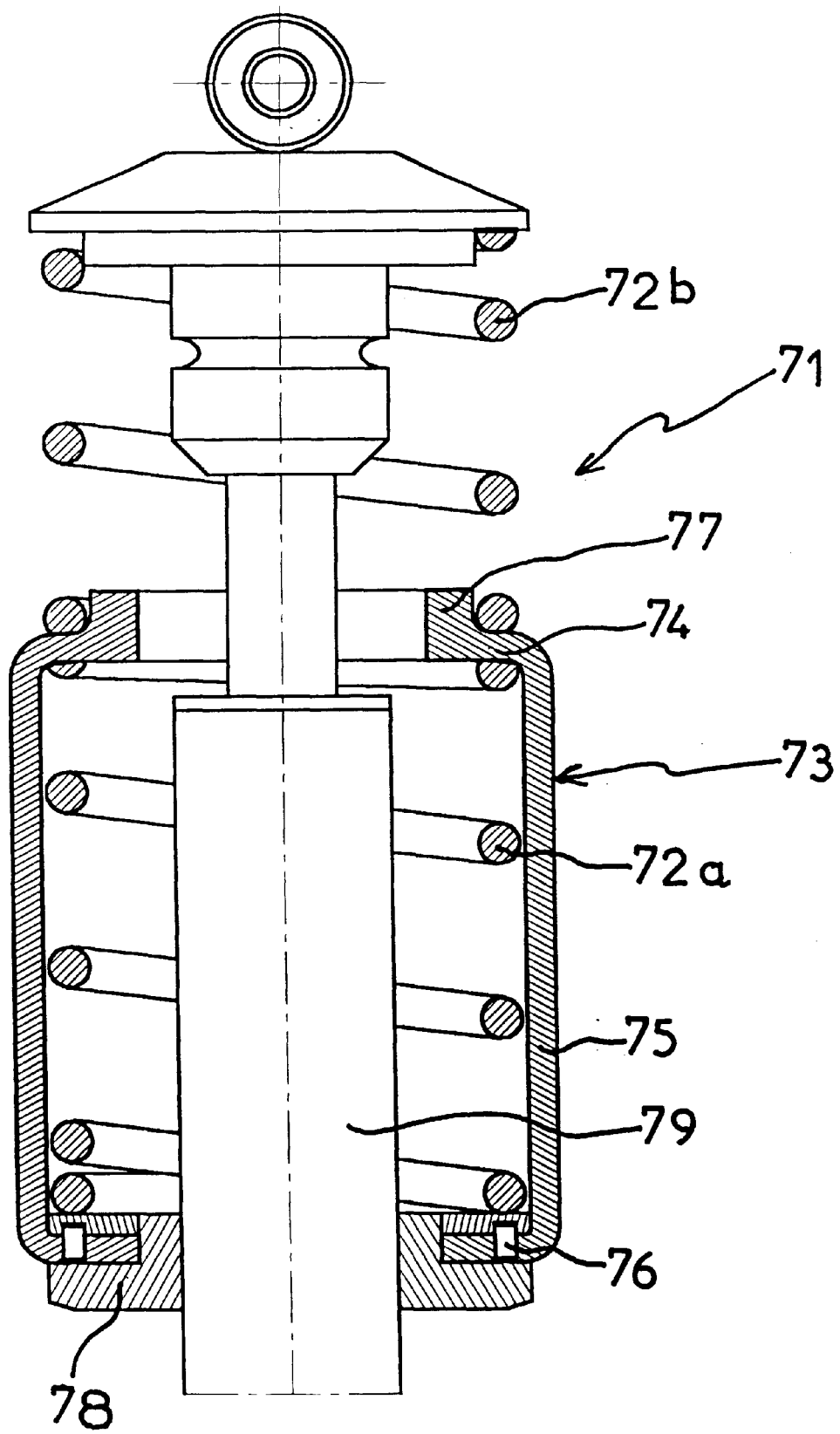
FIG. 12 shows in longitudinal cross-sectional view a suspension according to an eighth embodiment of the present invention.

According to FIG. 12, the suspension 71 is also constituted by an upper spring 72b and a lower spring 72a, the lower spring 72a being circumscribed by a flexible retaining and connecting armoring 73. The latter comprises an upper retaining element 74 which is positioned and permits the securement, by wedging between the two springs 72a and 72b, of the armoring 73.

Also to do this, there is an enlargement at the level of the end shown on the drawings.

This enlargement is thus constituted by a resilient pan 77 which secures together the assembly of the retaining and connecting armorings 73 of which two examples are shown in this figure.

In the lower position, the armoring 73 comprises a lower securement element 66 constituted by a rivet, which is connected to the resilient pan 77 by a resilient band 75.

The latter permits the securement relative to a lower bearing pan 78, the pan 78 being secured to the shock absorber 79.

In this embodiment, the resilient pan 77 is secured to armorings 73 but there can be three, four or more.

Figure 16:
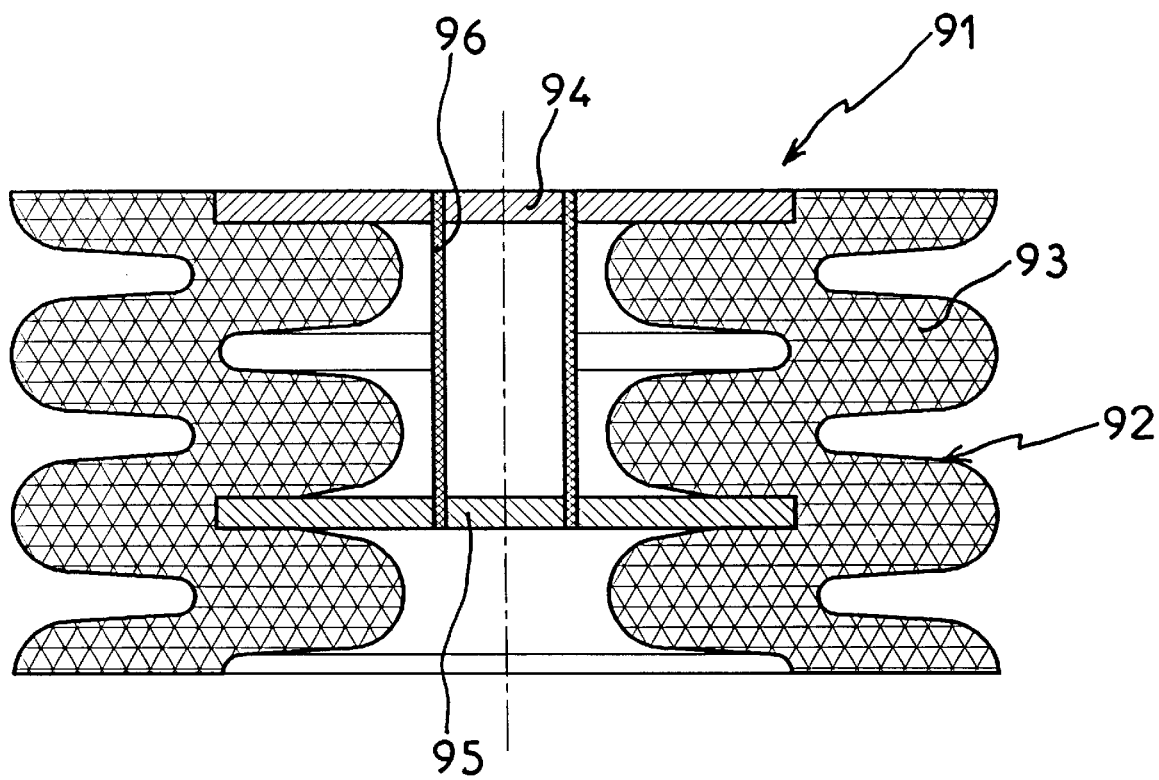

Finally, FIG. 16 shows the last embodiment of the present invention.

It comprises a suspension 81 including helicoidal springs whose general shape is truncated conical.

In this figure, it will be noted that the suspension 81 comprises between the two springs 82b and 82a, an intermediate bearing pan 87. The latter has a substantially S shape, one of the throats created by the S permitting the positioning of the upper winding of the lower spring 82a, whilst the other throat of the S permits the securement, on the one hand, of the upper end of the flexible retaining and connecting armoring 83 constituting the upper securement 84 and, on the other hand, of the lower winding of the upper spring 82b. This armoring 83 is constituted by a flexible skirt of conical shape.

In this position, the suspension is in the static position.

The shock absorber 89 is secured to the lower bearing pan 88 which receives the lower winding of the lower spring 82a.

The armoring 83 is secured by means of a lower securement element 86 on the body of the shock absorber 89, the two securement elements 84 and 86 being connected to each other by a longitudinal element 85.

Figure 13:
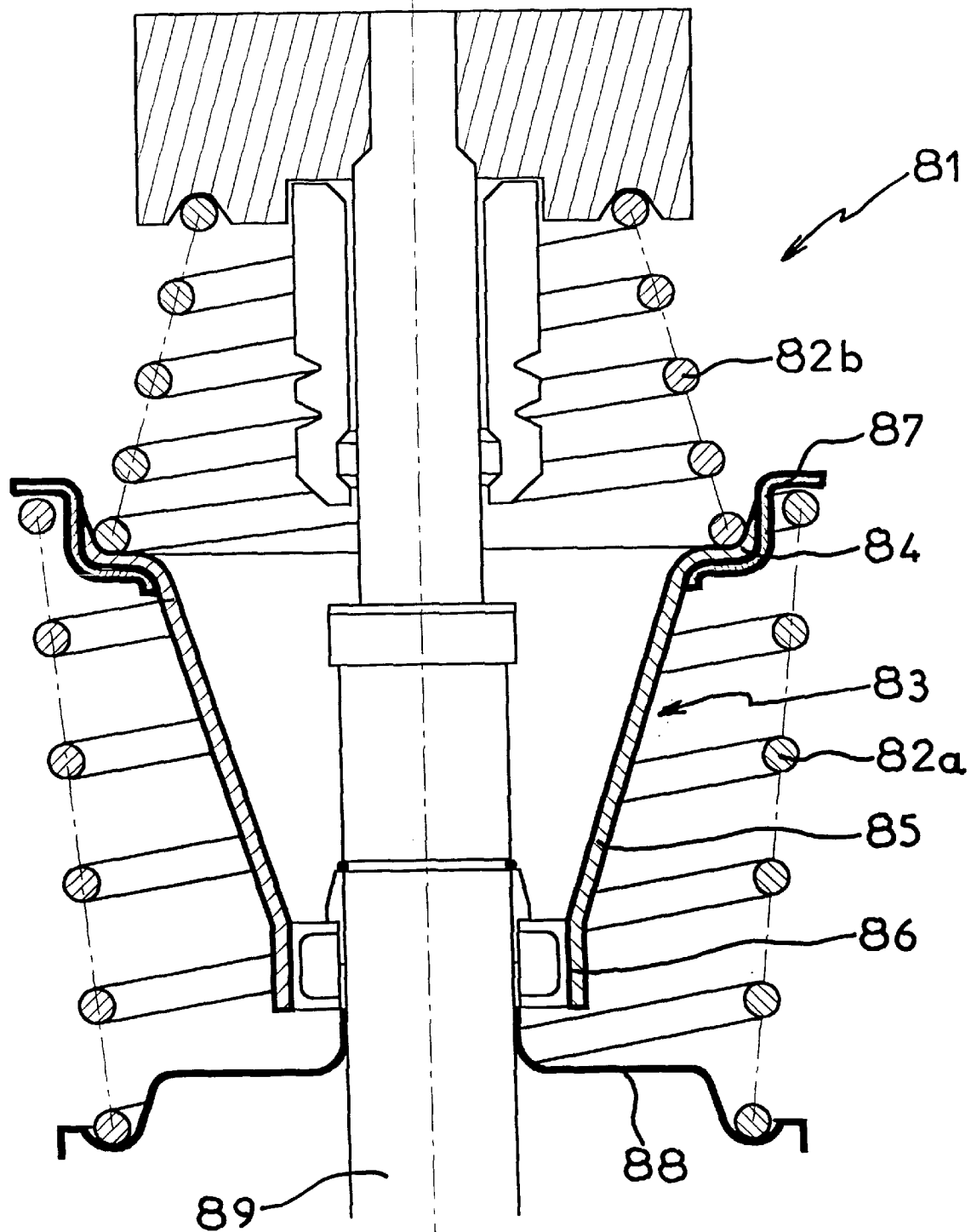
FIG. 13 shows a longitudinal cross-sectional view of a suspension according to a ninth embodiment of the present invention.
Figure 14:
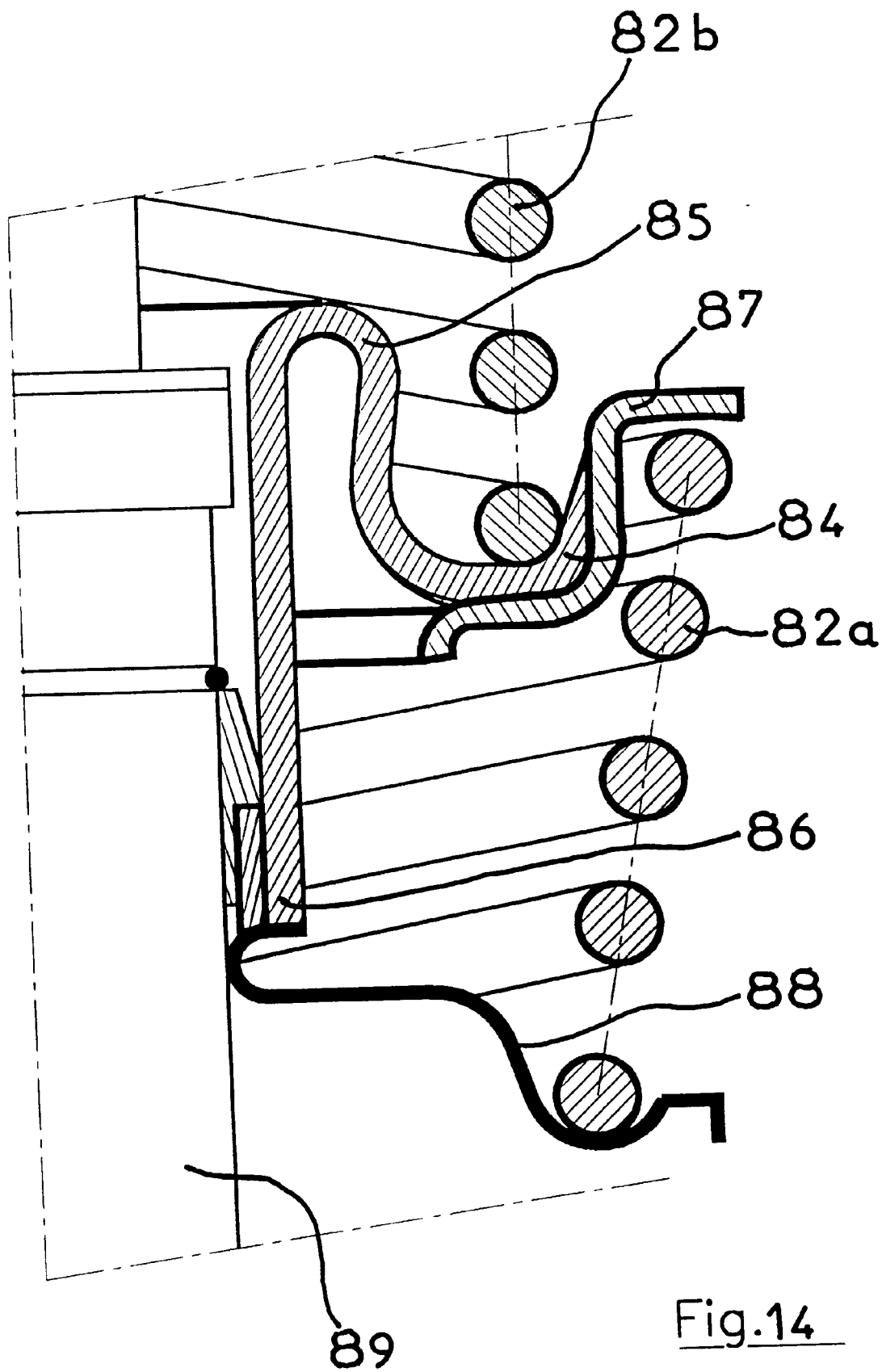
FIG. 14 shows a detailed view of the condition of the connecting abutment after compression as in FIG. 11.

According to FIG. 14, there will be noted a detail of FIG. 13 when the compression of the springs 84a and 84b takes place.

In this case, said armoring 83 will be bent to permit the compression of the assembly of the windings of the springs 82a and 82b.

Figure 15:
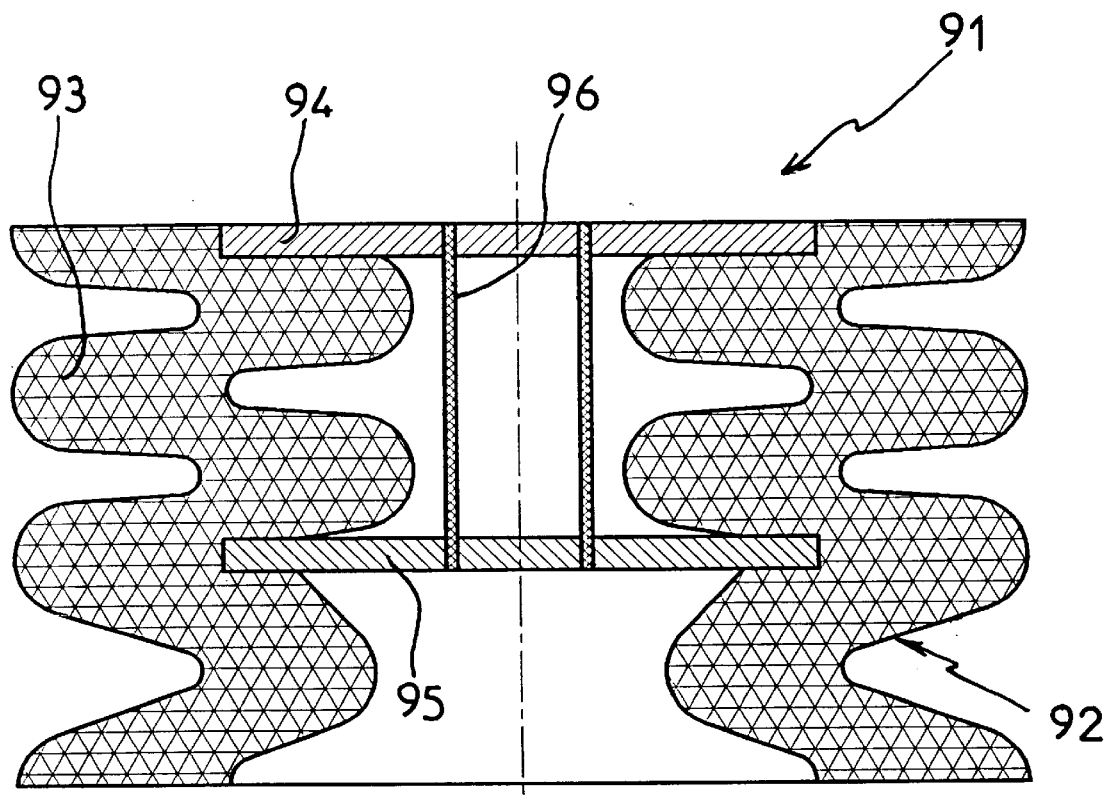
FIGS. 15, 16 and 17 show another embodiment which permits better understanding of the general operation of the present invention.
Figure 17:
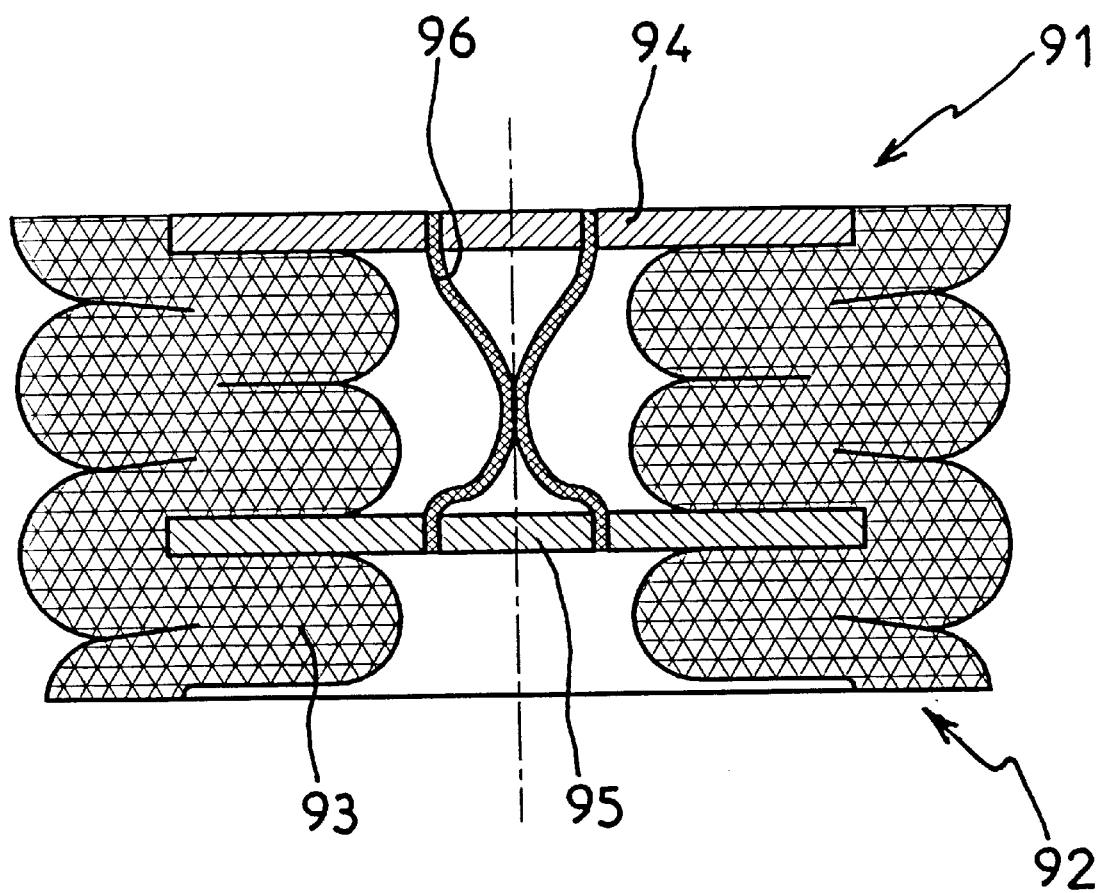

From FIGS. 15, 16 and 17, the operation of the system will be understood.

Thus, the helicoidal spring is replaced by a resilient spring 92 which comprises a certain number of folds 93 also in resilient material.

Certain of these folds 93 are confined between two upper 94 and intermediate 95 bearing pans.

For the good operation of the suspension 91, the two pans 94 and 95 are connected by metallic cables 96 which are deformable upon compression but indeformable in expansion.

Thus, in FIG. 15, the suspension is in the rest position, which is to say the confined portion is compressed whilst the unconfined portion is not.

According to FIG. 16, the folds 93 of the confined portion and unconfined portion have the same configuration such that the vehicle is in static working position.

Finally, FIG. 17 shows the embodiment during complete compression of the suspension 91.

In this case, the assembly of the folds 93 has an identical shape, which is to say completely compressed, whilst the metallic cables 96 are stretched, thereby permitting the approach to each other of the bearing pans 94 and 95.

REFERENCES

1. Suspension
2. Helicoidal spring
3. Flexible retaining and connecting armoring
4. Upper securement element of the armoring 3
5. Longitudinal element or elastic band
6. Lower securement element of armoring 3
11. Suspension
12. Helicoidal spring
13. Flexible retaining and connecting armature
14. Upper securement element of armoring 13
15. Longitudinal element or elastic band
16. Lower securement element of armoring 13
17. Upper bearing pan
18. Lower bearing pan
19. Mouthpiece of pan 17
21. Suspension
22. Helicoidal spring
23. Flexible retaining and connecting armoring
24. Upper retaining element of armoring
25. Longitudinal element or elastic band
26. Lower securement element of armoring 23
27. Screw
28. Lower bearing pan
29. Welds
31. Suspension
32. Helicoidal spring
33. Flexible retaining and connecting armoring
34. Upper retaining element of armoring 33
35. Longitudinal element or elastic band
36. Lower securing element of armoring 33
37. Screw
38. Lower bearing pan
39. Welds
40. Jack
41. Suspension
42. Helicoidal spring
43. Flexible retaining and connecting armoring
44. Upper retaining element of armoring 43
45. Longitudinal element or elastic band
46. Lower retaining element of armoring 43
47. Screw
48. Pillow block
51. Suspension
52. Helicoidal spring
53. Flexible retaining and connecting armoring
54. Upper securing element of armoring 53
55. Longitudinal element or elastic band
56. Lower securing element of armoring 53
57. Metallic armoring
58. Lower bearing pan
59. Shock absorber
61. Suspension
62a. Circumscribed helicoidal spring
62b. Uncircumscribed helicoidal spring
63. Flexible retaining and connecting armoring
64. Upper securing element of armoring 63 or rivet
65. Longitudinal element or elastic band
66. Lower securing element of armoring 63 or rivet
67. Intermediate bearing pan
68. Lower bearing pan
69. Shock absorber
71. Suspension
72a. Circumscribed helicoidal spring
72b. Uncircumscribed helicoidal spring
73. Flexible retaining and connecting armoring
74. Upper retaining element of armoring 73
75. Longitudinal element or elastic band
76. Lower securing element of armoring 73 or rivet
77. Elastic pan securing the elements 74
78. Lower bearing pan
79. Shock absorber
81. Suspension
82a. Circumscribed helicoidal spring
82b. Uncircumscribed helicoidal spring
83. Flexible retaining and connecting armoring
84. Upper securing element of armoring 83
85. Longitudinal element or elastic band
86. Lower securing element of armoring 83
87. Intermediate bearing pan
88. Lower bearing pan
89. Shock absorber
91. Suspension
92. Elastic spring
93. Folds of the spring 92
94. Upper bearing pan 95. Intermediate bearing pan
96. Metallic cables
F1. Air intake through the mouthpiece 19

What is claimed is:

1. Suspension for a vehicle wheel using at least one helicoidal spring, and at least one flexible retaining and connecting armoring, which in working position, stresses a portion of the spring by maintaining it compressed, to obtain two different stiffness curves of which the inflection point is adjacent the working position; relative to this position, upon a compression, the whole of the helicoidal spring is compressed and, upon expansion, only the unstressed portion of said spring is uncompressed, the suspension being therefore asymmetric with an expansion stiffness which is greater than its compression stiffness, wherein each armoring is constituted, on the one hand, comprises two securement and retaining elements, the one co-acting with all or a portion of a winding of the helicoidal spring, the other co-acting either with all or a portion of another winding of said spring, or with the body of the shock absorber, and a longitudinal element, deformable in compression and indeformable in expansion, secured to the two securement and retaining elements, the armature circumscribing and stressing at least two windings of the helicoidal spring.

2. Suspension, according to claim 1, which uses a single helicoidal spring and at least one flexible retaining and connecting armoring in which the two securing elements of each armoring co-act with all or a portion of two windings of the helicoidal spring, wherein each armoring comprises an elastic band which circumscribes all or a portion of at least two windings of said spring, the securing elements being constituted by loops of the elastic band and the two free ends being secured to each other.

3. Suspension, according to claim 1, which uses a single helicoidal spring and at least one flexible retaining and connecting armoring in which the two securing and retaining elements of each armoring co-act respectively with all or a portion of one of the windings of the helicoidal spring and with the body of the shock absorber, wherein each armoring is constituted comprises an elastic band which circumscribes all or a portion of at least windings of said spring, the securing and retaining elements being comprised by a loop of the elastic band at the level of the winding and by the two free ends of said band secured to the body of the shock absorber.

4. Suspension, according to claim 2, in which the flexible retaining and connecting armoring comprises two elastic half-bands located one on the inside, the other on the outside of the tubular or truncated conical shape comprised of the windings of the helicoidal spring, wherein the external and internal half-bands are secured to each other between all or a portion of two circumscribed and adjacent windings.

5. Suspension, according to claim 4, wherein the securement of the half-bands takes place in the plane of the tubular or truncated conical shape constituted by the windings of the helicoidal spring.

6. Suspension, according to claim 4, wherein the securement of the half-bands takes place outside the plane of the tubular or truncated conical shape comprised of the windings of the helicoidal spring.

7. Suspension, according to claim 1, which uses two helicoidal springs mounted in series and at least one retaining and connecting armoring in which the two securement and retaining elements of each armoring co-act respectively with all or a portion of one of the windings of the helicoidal springs and with the body of the shock absorber, wherein each armoring comprises an elastic band which includes at its two free ends, one of the securing or retaining elements fixed between the two helicoidal springs and, on the other hand, the other securing element secured to the body of the shock absorber.

8. Suspension, according to claim 7, wherein the securing element, fixed between the two helicoidal springs, is secured to a bearing pan which serves as an interface between the two springs.

9. Suspension, according to claim 7, which comprises at least two flexible retaining and connecting armoring, wherein the securing and retaining elements, fixed between the two helicoidal springs, are secured by means of a floating pan which separates the two springs.

10. Suspension, according to claim 1, wherein the flexible retaining and connecting armorings are elastic and enclose cables which render the armorings deformable in compression and indeformable in expansion.

11. Suspension, according to claim 1, wherein each flexible retaining and connecting armoring is provided with a jack permitting adjusting the stress.

12. Suspension for a vehicle wheel using at least one elastic spring, and at least one retaining and connecting armoring, which in working position, stresses a portion of the spring by maintaining it compressed to obtain two different stiffness curves of which the inflection point is adjacent the working position; relative to this position, upon a compression, the assembly of the resilient spring is compressed and, upon expansion, only the unstressed portion of said spring is decompressed, the suspension being thus asymmetric with a stiffness in expansion which is greater than the stiffness in compression, wherein each retaining and connecting armoring comprises two securing elements, one co-acting with a portion of the resilient spring, the other co-acting with another portion of said spring, and at least one longitudinal element deformable in compression and indeformable in expansion, secured to the two securing elements, the retaining and connecting armoring circumscribing and stressing at least over all or a portion of the length the elastic spring.

13. Suspension according to claim 12, wherein the securing elements comprise an upper bearing pan and a lower bearing pan, interconnected by longitudinal elements or cables.

* * * * *